Jan. 6, 1925.

J. RUTHS 1,522,082

LIQUID LEVEL CONTROL

Filed Jan. 8, 1923    2 Sheets-Sheet 1

Inventor
J. Ruths
By Marker Clark
Attys.

Jan. 6, 1925.    1,522,082

J. RUTHS

LIQUID LEVEL CONTROL

Filed Jan. 8, 1923    2 Sheets-Sheet 2

Inventor:
J. Ruths

Patented Jan. 6, 1925.

1,522,082

UNITED STATES PATENT OFFICE.

JOHANNES RUTHS, OF DJURSHOLM, SWEDEN, ASSIGNOR TO AKTIEBOLAGET VAPOR-ACKUMULATOR, OF STOCKHOLM, SWEDEN, A CORPORATION OF SWEDEN.

LIQUID-LEVEL CONTROL.

Application filed January 3, 1923. Serial No. 611,534.

*To all whom it may concern:*

Be it known that I, JOHANNES RUTHS, a subject of the King of Sweden, residing at Djursholm, Sweden, have invented certain new and useful Improvements in a Liquid-Level Control, of which the following is a specification.

This invention relates to method and apparatus for control of water level in receptacles and embodies a combination of liquid level and pressure responsive devices acting on a means to control the level of water in the receptacle and has among its objects to provide means to compensate for changes of pressure with respect to water level; to make it possible to maintain a certain relativity between water level and pressure; to regulate flow of a liquid in response to pressure and height of water; to control the flow of water into and water out of certain receptacles; to prevent influx or efflux of water to or from certain receptacles as long as the pressure and water level have mutually proper relative values and to automatically control the water level in steam accumulators.

Other objects of the invention will be apparent as the description proceeds.

In receptacles containing a liquid and subjected to a variable pressure, it frequently occurs that a certain level of the liquid should correspond to a certain pressure, and that there should be a different normal water level for each pressure. It is then desirable that such level of the liquid should be maintained fully automatically at its normal value relatively to the momentary pressure. If for any reason the level of the liquid would rise above this normal value with respect to any given pressure, liquid must be drawn off from the receptacle, whereas liquid has to be supplied to the receptacle should the level of the liquid fall below the normal value. Conditions as these exist for instance in air vessels, steam accumulators and so forth.

If, for example, on the discharge of a steam accumulator, the same shall give off a certain calculated quantity of steam, the water level of the accumulator while in charged condition has to be maintained as calculated. It will be found, however, that even if the water level has been adjusted correctly on the first charge of the storer, the same shows a tendency, after a plurality of charging and discharging operations, to rise above or to sink below the normal with respect to the momentary pressure. Radiation of heat from the accumulator causes a rise of the water level. This is due to the fact that the water content of the accumulator is cooled down by the radiation of heat, and a quantity of charging steam larger than calculated has to be supplied in order to attain the determined steam pressure for the condition of charge. By reason of this the water level will rise in the accumulator. On the other hand, the charging steam usually has a greater heat content per pound than the discharging steam, in that steam from the accumulator is discharged with a sinking of the pressure, and therefore the average of its heat content during the discharge is lower than the heat content of dry, saturated steam of the maximum pressure of the accumulator. Besides, the charging steam has usually a higher pressure than the maximum pressure of the accumulator, and it is frequently superheated, by reason of which it may be established as a rule that the heat content of the charging steam is greater than that of the discharging steam. The result of this is that a greater quantity of heat is supplied to the accumulator, per pound of charging steam, than is taken out of the storer per pound of discharging steam. For this reason a smaller quantity of charging steam is required than of discharging steam, and consequently the water level falls. Depending on which one of the above mentioned factors prevails over the other, the water level in the accumulator therefor either slowly rises above or falls below the normal relativity between water level and pressure. If the accumulator is discharged comparatively seldom, the water level tends to rise on account of the losses due to radiation, whereas, if it is frequently discharged, the water level tends to fall, since more steam is taken out of the accumulator than the amount of steam supplied to the same. In only exceptional cases will the above mentioned influences be balanced so that a normal water level is obtained relatively to the pressure.

The present invention automatically controls the level of the liquid in such receptacles. By means of the apparatus herein disclosed liquid is automatically supplied to the receptacle when the level of the liquid is too low, while liquid is automatically drawn off from the receptacle when the level is too high.

The invention consists preferably in a float which is connected with a piston, bellows, diaphragm or the like on which the static pressure of the receptacle is caused to act on the one side, while a constant or nearly constant pressure such as the atmospheric pressure prevails on the other side, in such manner that, on the level of the liquid being normal with respect to the momentary pressure prevailing in the receptacle, the forces actuating the float and the piston are balanced, whereas when the level of liquid deviates from normal the one or the other force prevails over the other and effects a regulation of the level of the liquid, so that the level of the liquid will again be restored to a normal value with respect to the pressure of the receptacle.

As stated, the apparatus is based on a co-operation between a float and a pressure plunger, bellows or the like. The use of only a float alone is precluded, in that the proper value of the water level is dependent on the pressure of the accumulator. For example at the maximum pressure of the accumulator, that is to say on the charged condition thereof, the water level has to be high, and in the discharged condition, when the pressure of the accumulator is the lowest, the water level should have its lowest value. If the pressure of the accumulator is between these limits, the water level has to assume a corresponding intermediate position.

In the accompanying drawings, Figs. 1-7 illustrate a like number of embodiments of the invention which will be described more fully hereinbelow, with reference to the said figures.

Figure 1:
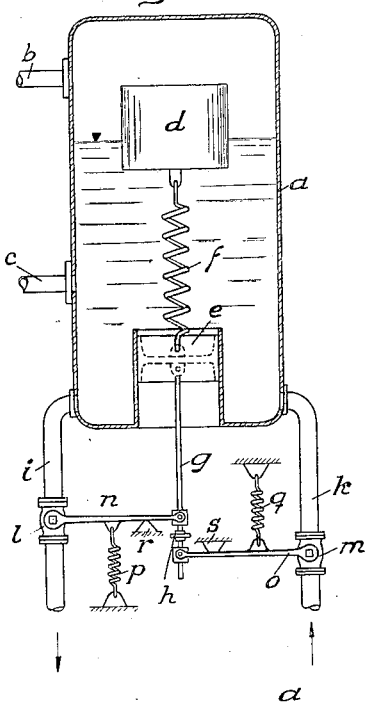
Fig. 1 shows one embodiment of my invention embodying a float and piston interconnected to operate a flow control mechanism.

In Fig. 1, $a$ designates the receptacle containing a liquid. This receptacle may be the main receptacle in which the water content is to be controlled or may consist in a smaller receptacle which is connected by means of pipe connections $b$ and $c$, with a larger receptacle in which the level of the liquid is to be controlled. By reason of the receptacles being in communicating connection with each other, the level of liquid will always be the same therein. $d$ denotes a float and $e$ is a piston on which the static pressure of the container is caused to act on the one side, and on which a constant pressure— in this case the atmospheric pressure—acts on the other side. The float $d$ and the piston $e$ are connected with each other by means of the spring $f$. Extending from the piston $e$ is a rod $g$ provided with an abutment $h$. The receptacle is provided with an outlet conduit $i$ and a supply conduit $k$ in which the valves $l$ and $m$ respectively are arranged. These valves are operated by means of the levers $n$ and $o$ respectively, the same being kept closed when the levers $n$ and $o$ are caused to bear against the abutments $r$ and $s$ by the springs $p$ and $q$ respectively. The arrangement works in the following manner:—

If the level of the liquid is normal with respect to the pressure in the receptacle, then the buoyant force on the float $d$ will be equal to the pressure exerted on the piston $e$. Spring $f$ will then have a tension corresponding to these forces, and this tension is altered according to the alteration of the level of the liquid and of the pressure in the receptacle. As long as the normal level of the liquid prevails, corresponding to the momentary pressure of the receptacle, the piston $e$ will not move in the one nor in the other direction. However, if for any reason the level of the liquid would rise above this normal value, the buoyant force on the float $d$ will be greater than the force acting downwards on the piston $e$, by reason of which the latter is pulled upwards together with the rod $g$, taking the lever $n$ along with it and lifting the latter off the abutment $r$, the valve $l$ being thus opened so as to allow liquid to flow out through the outlet $i$. Since the level of the liquid is now falling, the piston $e$ will be displaced downwards, after which it is again adjusted to its former position on the normal level of liquid having been attained. In case the level of liquid in the receptacle would be lower than the level which shall normally correspond to the pressure prevailing for the time being, the pressure exerted on the piston $e$ will prevail over the buoyant force on the float $d$, by reason of which the piston $e$ is displaced downwards, the rod $g$ then turning the lever *o* in a direction downwards by means of the abutment *h*, so that the valve *m* is opened and liquid is supplied to the receptacle through the conduit *k*.

Figure 2:
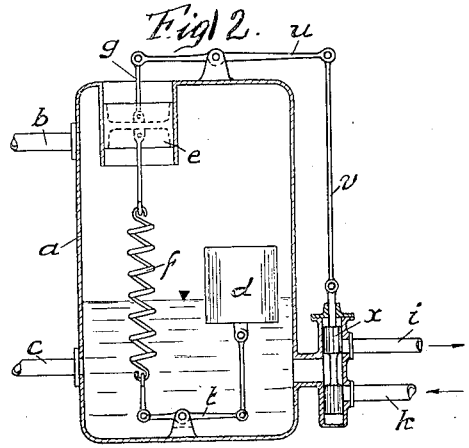
Fig. 2 shows a slightly different embodiment with a different connecting arrangement between the float piston and the flow control mechanism.

Fig. 2 shows another embodiment of the invention. In this figure, *a* denotes the receptacle, as before, which may be connected with another receptacle (not shown) by means of the pipe connections *b* and *c*. *e* is the piston and *d* the float, and provided between these is the spring *f*. The piston *e* actuates the lever *u* by means of the rod *g*, and the rod *v* actuates the slide valve *x* which latter, on a normal level of the liquid, cuts off the connection between the receptacle and the supply *k* and outlet *i* respectively.

When there is a normal level of liquid with respect to the pressure prevailing in the receptacle for the time being, the piston *e* will remain stationary, in agreement with the description referring to Fig. 1. Slide valve *x* will therefore remain in the position shown in the drawing. If for any reason the level of the liquid in the container should rise above the normal, the piston *e* will be pulled downwards while the slide valve *x* is pulled upwards by means of rod *g*, lever *u* and rod *v* so that liquid is drawn off from the receptacle through the outlet *i*. Again, if for any reason the level of the liquid should be lower than normal, the piston *e* will be displaced upwards, which results in the slide valve *x* being displaced downwards, liquid being thus supplied to the receptacle through the supply conduit *k*.

Figure 3:
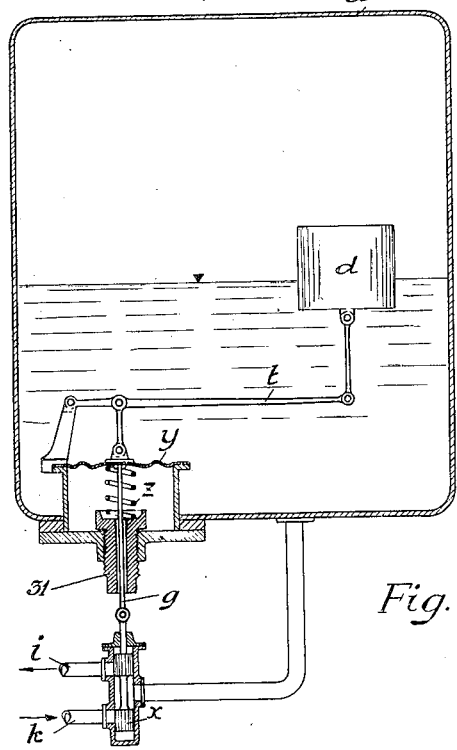
Fig. 3 shows an embodiment wherein a diaphragm is used and in which an adjusting device is applied to the controlling elements.

In Fig. 3, a further embodiment of the invention is shown in which the piston *e* described in the preceding figures has been replaced by a diaphragm *y*. Besides, the spring which was formerly designated by *f*, has in the present case been replaced by a pressure spring *z* adapted to be adjusted by means of the nut 31 for adjusting a certain level of liquid with respect to a certain pressure in the receptacle. The diaphragm *y* is connected with the slide valve *x* by means of the rod *g*, said slide valve *x* serving as a medium for connecting the receptacle and the outlet *i* and supply *k* respectively. The operation of the arrangement should be readily understood from the statement referring to Figs. 1 and 2.

Figure 4:
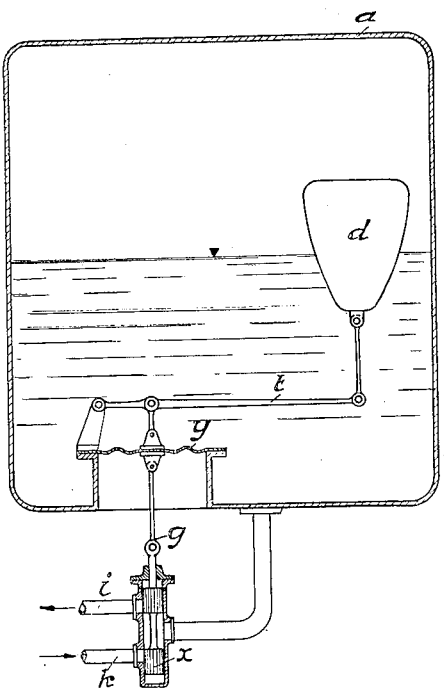
Fig. 4 shows an embodiment wherein the float has a peculiar shape whereby certain elements of the former devices may be omitted.

In order to avoid the use of spring *f* or *z* respectively, the float *d* may be constructed of such a shape that the buoyant force acting thereon will always, on a normal level of liquid with respect to the momentary pressure in the receptacle, be equal to the force acting on the piston or the diaphragm respectively. Such an embodiment is shown in Fig. 4, in which the reference characters correspond to those in Fig. 3, and the mode of operation should be clearly understood from the foregoing description.

Figure 5:
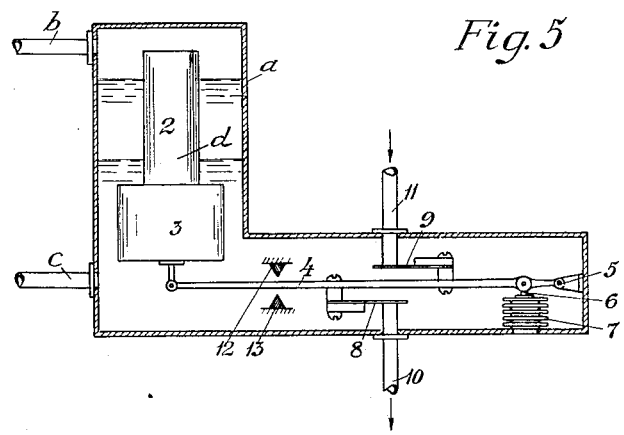
Fig. 5 shows an embodiment including a float of a particular shape and an arrangement of parts differing from the previous figures.

Fig. 5 illustrates a further embodiment of the invention, adapted to be connected with a steam accumulator. The float *d* consists in this case of two parts, that is, an upper narrower part 2 and a lower wider part 3, which latter is always below the water level, the float being connected with the movable element or lever 4 moving about the fulcrum 5. A link 6 is also connected with the lever, said link 6 being connected to a piston or bellows 7 loaded on the upper side by the pressure of the storer and on the lower side by the atmospheric pressure. The lever 4 also carries a couple of thin resilient plates 8 and 9, toward which the conduits 10 and 11 open, bearing thereagainst with a tight fit, provided that the lever 4 is in its intermediate position. If the latter rises above the intermediate position, it will open the mouth of the conduit 10, while the spring 9 is being compressed so as to still hold conduit 11 closed. Again, if the lever 4 is lowered, the mouth of the conduit 11 will be opened, whereas conduit 10 is kept closed. The movements of the lever 4 are limited by the abutments 12 and 13. The apparatus operates in the following manner:—

As mentioned hereinbefore, for each pressure in the accumulator there is a different normal water level. The buoyancy of the float and the pressure on the bellows are so adapted as to balance the lever 4 if the pressure and the water level have mutually proper values. The mouths of conduits 10 and 11 are then both kept closed. If the water level rises above the value which is normal for the momentary pressure of the accumulator, the float will be elevated, thereby raising lever 4 until the latter strikes against the abutment 12. Conduit 10 is now opened while conduit 11 is kept closed. Said conduit 10 is preferably connected with a feed water reservoir, and on opening same, water will flow out of the accumulator to the said reservoir. Thus the water level is again caused to fall within the accumulator, and the balance will be restored as soon as the water level has again attained the normal value for the pressure in question. Again, if the water level is too low with respect to the pressure of the accumulator, the float will sink and bring the lever 4 along with it until the said lever strikes against the lower abutment 13. Thus conduit 11 will be opened, whereas conduit 10 is kept closed. Water will then flow in through conduit 11, for instance from the feed water conduit leading to boilers in the plant, to the accumulator, whereby the water level will again rise so as to establish a balance on the water level having again reached the normal value for the pressure in question.

The movement of the float is rather small during the regulation, only corresponding to the distances between the abutments 12 and 13. Therefore, the float does not follow the water level, but the same will be situated further down with respect to the water level when the latter rises, whereby an ever increasing upwardly directed force is produced, which will thus balance a pressure of the accumulator on the bellows which will be so much higher the higher the water level is.

Figure 6:
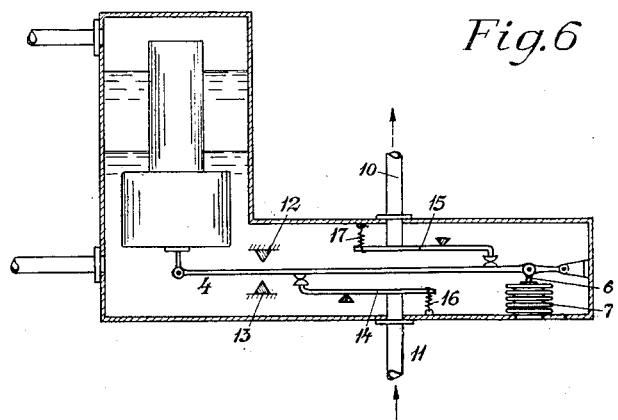
Fig. 6 shows an embodiment somewhat like that of Fig. 5 but having a different relative arrangement with respect to inlet and outlet pipes.

Fig. 6 illustrates a further embodiment of the arrangement. The plates 8 and 9 are replaced by two levers 14 and 15 mounted in the receptacle, such levers being pressed against the mouths of conduits 10 and 11 by means of springs 16 and 17, while bearing with a tight fit against said pipes which are reversed with respect to Fig. 5. If the lever 4 is raised from its intermediate position, it will move lever 15 so that the latter opens the mouth of conduit 10. Again, if the lever 4 is lowered, the mouth of conduit 11 will be correspondingly opened.

Figure 7:
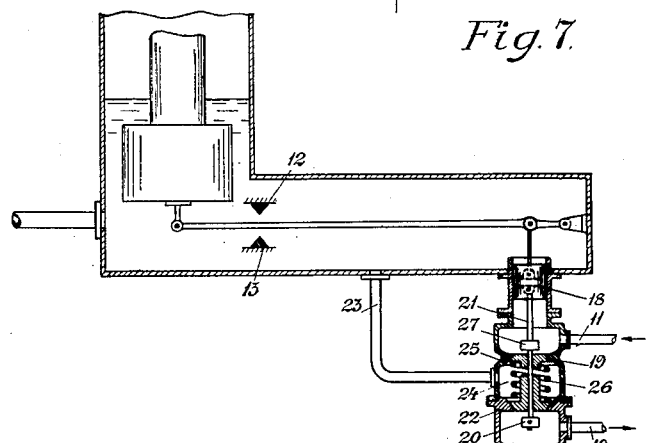
Fig. 7 shows an embodiment utilizing a float of different cross sections and a piston.

Fig. 7 illustrates a further embodiment of the invention. Here the bellows is replaced by a piston 18 which is connected with a double valve 19. On the float being raised, the lower valve 22 will be lifted off its seat by reason of the boss 20 on the rod 21, and water flows out through the conduit 23, the chamber 24 and the outlet 10, from the storer. During this movement the upper valve 25 is kept closed, the same being pressed against the upper seat by the spring 26. Again, if the float is lowered the piston 18 presses down the upper valve 25 through the medium of the boss 27, the connection between conduits 11 and 23 being thereby opened so that water may be supplied to the accumulator. While this is taking place, the lower valve 22 is kept closed by the spring 26.

In the embodiments shown, the supply of liquid to the receptacle or the outlet therefrom is influenced directly by the piston, diaphragm or the like. This influence may, however, also be indirect.

By making the position of the float relatively to the piston, diaphragm or the like adjustable, the height of the liquid may be adjusted.

What I claim as new and desire to secure by Letters Patent of the United States of America is:—

1. A receptacle for liquid, means to change the liquid content of the receptacle responsive to static pressure and liquid level in the receptacle.

2. Automatic control means for the level of liquid in pressure receptacles comprising a movable element, a conduit, a valve in said conduit, means whereby the movable element controls the valve, means to move the movable element in one direction upon rise of pressure and means to move the movable element in the opposite direction upon rise of water level and means to permit relative movement of said movable element and valve.

3. In a steam accumulator wherein there is a different normal water level for each pressure, automatic means to supply water to the accumulator when the water level rises above the normal water level corresponding to the momentary pressure and automatic means to discharge water from the accumulator when the water level falls below the normal water level corresponding to the momentary pressure.

4. A receptacle containing water under pressure, means to supply water to said receptacle, means to discharge water from said receptacle, mechanism to control said means responsive to the pressure and water level in the receptacle.

5. In a steam accumulator, a supply conduit, a discharge conduit, valve mechanism to control the flow through said conduits, means for controlling said valve mechanism to maintain different water levels for different pressures.

6. A receptacle containing liquid under pressure, a conduit associated with said receptacle, means to control the flow through said conduit subjected to the liquid in the receptacle and responsive to pressure changes therein and means to control the flow through said conduit responsive to changes of liquid level in said receptacle.

7. A receptacle containing liquid under pressure, a conduit to discharge liquid from said receptacle, a float adapted to control the discharge through said conduit and a pressure responsive device adapted to control the discharge through said conduit.

8. A receptacle containing liquid under pressure, a conduit to supply liquid to said receptacle, a conduit to discharge liquid from said receptacle, valve mechanism to control the supply and discharge of liquid through the conduits, a float operatively connected with said mechanism and controlled by the level of liquid in the receptacle, a pressure operated element operatively connected with said valve mechanism and controlled by the pressure in the receptacle.

9. In a steam accumulator wherein there is a different water level corresponding to each pressure, means to vary the water contents of the accumulator, mechanism responsive to the water level to move said means in one direction upon rise of water level and mechanism responsive to the static pressure in the accumulator to move said means in the opposite direction upon rise of pressure.

10. In a steam accumulator, means to vary the water contents of said accumulator, mechanism responsive to the water level of the accumulator to effect the operation of said means, mechanism responsive to the static pressure in said accumulator to neutralize the effect of said first mechanism under normal conditions of water level with respect to pressure.

11. A receptacle containing liquid under pressure, a conduit leading liquid to said receptacle, means to control the flow of liquid through said conduit, a float responsive to the level of liquid in said receptacle to control said means, mechanism responsive to the static pressure in the receptacle to modify the effect of said float.

12. In a receptacle containing liquid under pressure, a valve, means adapted to move the valve in one direction upon rise of pressure within the receptacle, means to move the valve in the other direction upon rise of liquid level.

13. In a steam accumulator, means to maintain different water levels for different pressures comprising a valve, a float, means connecting said float with said valve, a pressure operated element responsive to static pressure in the accumulator means connecting said pressure operated element with said valve.

14. In a steam accumulator, a conduit supplying liquid to said accumulator, a conduit discharging liquid from said accumulator, control means to regulate the flow through said conduits, a float, means connecting said float with said control means, a pressure operated element, means connecting said pressure operated element with said control means.

15. In a steam accumulator, a valve, a float, means connecting said float with said valve, a piston adapted to be influenced by static pressure in the accumulator, means connecting said piston with said valve.

16. In a steam accumulator, a conduit leading water to said accumulator, means to control flow of water through said conduit, a float, a pressure responsive element subjected on one side to the pressure in the accumulator and on the other side to a constant pressure, means interconnecting said float, said pressure responsive element and said valve.

17. A receptacle containing water under pressure, a float in said receptacle, a pressure responsive element subjected on one side to the pressure in the receptacle and on the other side to a pressure independent of the pressure in the receptacle, means associated with said float and pressure responsive element to control the water content of the receptacle.

18. In a receptacle containing liquid under pressure, means to maintain different liquid levels for different pressures comprising a liquid level responsive device and a pressure responsive device so arranged that the force of the liquid level responsive device opposes the force of the pressure responsive device, means responsive to said forces to admit liquid to the receptacle when the pressure within the receptacle rises.

19. In combination, a steam accumulator, a supply conduit and a discharge conduit connected with said accumulator, a valve to control flow through said conduits, means adapted to move the valve in one direction upon rise of static pressure in said accumulator, and means to move the valve in another direction upon rise of liquid level in the accumulator.

20. A receptacle containing liquid under pressure, a conduit connected to said receptacle, a float adapted to be moved by the liquid level in said receptacle, a valve in said conduit, pressure operated means adapted to influence said valve, means to influence said valve in response to movement of said float, and means allowing play between said valve and influencing means.

21. A receptacle containing liquid under pressure, a float the greater portion of which is submerged, valve mechanism to control the liquid content of the receptacle, an element responsive to the pressure of liquid in the receptacle, means to operate said valve upon movement of said float and pressure responsive element.

22. A receptacle containing liquid under pressure, a float having a wide lower portion and a narrow upper portion the greater portion of which is submerged, valve mechanism to control the liquid content of the receptacle, an element responsive to the pressure in the receptacle, means to operate said valve upon movement of said float and pressure responsive element.

23. A receptacle containing liquid under pressure, a conduit connected with said receptacle, a valve in said conduit, a lever, a liquid level responsive device adapted to exert a force on said lever in one direction, a pressure operated device adapted to exert a force on said lever in the opposite direction, said forces acting in parallel on said lever and means to move said valve upon movement of said movable element.

24. A receptacle containing liquid under pressure, a conduit connected with said receptacle, a valve in said conduit, a movable element, a float operatively connected with said movable element and adapted to move the same, a device operated by static pressure in the receptacle operatively connected with said movable element and adapted to move the same, means to move said valve upon movement of said movable element, and means permitting relative movement of said movable element and said valve.

25. In a steam accumulator, a conduit connected with said accumulator, valve mechanism to control the flow through said conduit, a movable element, a float influenced by changes of water level in the accumulator and operatively connected with said movable element, a member responsive to static pressure in the accumulator adapted to exert a force on said movable element in opposition to the force exerted by said float so that the movable element remains stationary so long as the pressure and water level have normally mutual values, means to move said valve when said movable element is moved due to a deviation from the normal relativity of pressure and water level.

26. In a steam accumulator, means to maintain different water levels for different pressure comprising a conduit connected with said accumulator, valve mechanism to control the flow through said conduit, a movable element, a float influenced by changes of water level in the accumulator and operatively connected with said movable element, a pressure operated piston operated in response to changes of pressure in the water in the accumulator adapted to exert a force on said movable element in opposition to the force exerted by said float so that the movable element remains stationary so long as the pressure and water level have normally mutual values, means to move said valve when said movable element is moved due to a deviation from the normal relativity of pressure and water level.

27. The method of controlling the liquid level in a receptacle which consists in causing a force responsive to the liquid level to act on a member, causing a force responsive to static pressure in the receptacle to act on the member and regulating flow of liquid with respect to the receptacle to maintain said forces in equilibrium.

28. The method of controlling the liquid level in a receptacle which consists in causing a force responsive to the liquid level in the receptacle to oppose a force responsive to static pressure in the receptacle and utilizing a state of unbalance of the forces to control the flow of liquid with respect to the receptacle to change the liquid content thereof.

29. The method of controlling the liquid level in a receptacle which comprises causing a force responsive to static pressure in the receptacle to oppose a force responsive to liquid level and utilizing a preponderance of the pressure force over the liquid level force to increase flow of liquid into the receptacle.

30. The method of controlling the liquid level in a receptacle which consists in causing flow of liquid to and from the receptacle to change in response to the liquid level and modifying the said flow in response to pressure changes in the receptacle.

31. The method of controlling a valve in a conduit adapted to supply liquid to a receptacle which consists in causing a normal relativity of liquid level and static pressure in the receptacle to maintain the valve in a state of rest and causing a deviation of normal relativity of liquid level and static pressure to move said valve.

32. The method of controlling the water level in an accumulator which consists in causing a force responsive to static pressure in the accumulator to oppose a force responsive to water level in the accumulator, causing a preponderance of the pressure force over the water level force to admit water into the accumulator and causing a preponderance of the water level force over the pressure force to discharge water from the accumulator.

In testimony whereof I affix my signature in presence of two witnesses.

JOHANNES RUTHS.

Witnesses:
ERIC HEDGES,
M. PAULSON.